United States Patent
Perrin et al.

(10) Patent No.: US 8,640,862 B2
(45) Date of Patent: Feb. 4, 2014

(54) SEAM-ON LAMINATED BELT

(75) Inventors: Dominique Perrin, St. Junien (FR);
Jean-Louis Monnerie, St. Junien (FR)

(73) Assignee: Albany International Corp., Albany, NY (US)

( * ) Notice: Subject to any disclaimer, the term of this patent is extended or adjusted under 35 U.S.C. 154(b) by 588 days.

(21) Appl. No.: 11/400,896

(22) Filed: Apr. 10, 2006

(65) Prior Publication Data
US 2007/0235154 A1 Oct. 11, 2007

(51) Int. Cl.
*B65G 15/34* (2006.01)

(52) U.S. Cl.
CPC ..................................... *B65G 15/34* (2013.01)
USPC ....................................... 198/847; 198/844.1

(58) Field of Classification Search
USPC .......................... 198/847, 844.1, 844.2, 846; 474/255–258, 264, 268; 24/33 R, 33 A, 24/33 P, 33 B, 33 K, 33 C, 31 B, 31 H, 38
See application file for complete search history.

(56) References Cited

U.S. PATENT DOCUMENTS

| | | | |
|---|---|---|---|
| 1,360,456 A * | 11/1920 | Shiner ............................ | 474/248 |
| 2,488,872 A * | 11/1949 | Mathieu ......................... | 198/847 |
| 2,516,779 A * | 7/1950 | Lesesne ......................... | 474/254 |
| 2,893,007 A * | 7/1959 | De Windt ....................... | 29/428 |
| 2,932,340 A * | 4/1960 | Poeschl ......................... | 474/254 |
| 3,224,566 A * | 12/1965 | Elliott ........................... | 198/847 |
| 3,297,513 A * | 1/1967 | Robinson ....................... | 198/847 |
| 3,620,897 A * | 11/1971 | Katsukiyo et al. ............ | 442/360 |
| 4,109,543 A * | 8/1978 | Foti ............................... | 198/847 |
| 4,244,084 A | 1/1981 | Gisbourne ..................... | 24/33 C |
| 4,279,676 A * | 7/1981 | Morrison et al. ............. | 156/159 |
| 4,344,209 A | 8/1982 | Harwood ....................... | 24/31 R |
| 4,364,421 A | 12/1982 | Martin ........................... | 139/383 |
| 4,427,734 A | 1/1984 | Johnson | |
| 4,427,743 A | 1/1984 | Katsuki et al. ............ | 428/424.6 |
| 4,518,647 A * | 5/1985 | Morrison ....................... | 442/246 |
| 4,569,375 A | 2/1986 | Borel ............................. | 139/383 |
| 4,574,435 A | 3/1986 | Luciano et al. ............... | 24/33 C |
| 4,698,250 A * | 10/1987 | Talonen et al. ................ | 428/58 |
| 4,764,417 A | 8/1988 | Gulya ........................... | 428/222 |
| 4,806,208 A | 2/1989 | Penven ......................... | 162/199 |
| 4,827,579 A | 5/1989 | Gisbourne ..................... | 24/391 |
| 4,839,213 A | 6/1989 | Gauthier ....................... | 428/114 |
| 4,842,925 A | 6/1989 | Dufour et al. | |
| 4,862,926 A | 9/1989 | Barrette et al. .......... | 139/383 AA |

(Continued)

FOREIGN PATENT DOCUMENTS

DE 1 255 999 12/1967
DE 2 102 478 10/1972

(Continued)

OTHER PUBLICATIONS

Product Brochure of Siegling entitled "Product Range Conveyor and Processing Belts" (18 pages).

*Primary Examiner* — William R Harp
(74) *Attorney, Agent, or Firm* — Frommer Lawrence & Haug LLP; Ronald R. Santucci (57) ABSTRACT

An on-machine-seamable industrial belt and method of forming an on-machine-seamable industrial belt including the steps of providing a base structure having first and second edges, providing a seam connecting the first and second edges, and laminating a layer onto the base structure and the seam.

24 Claims, 6 Drawing Sheets

(56) References Cited

U.S. PATENT DOCUMENTS

| | | | | |
|---|---|---|---|---|
| 4,896,702 A | | 1/1990 | Crook | 139/383 A |
| 5,031,283 A | * | 7/1991 | Aldrich | 24/33 P |
| 5,217,415 A | | 6/1993 | Wasylezuck et al. | 474/256 |
| 5,358,014 A | | 10/1994 | Kovar | 139/383 |
| 5,360,656 A | | 11/1994 | Rexfelt et al. | 428/193 |
| 5,377,722 A | | 1/1995 | Jaala | 139/383 AA |
| 5,421,450 A | * | 6/1995 | Kitagawa et al. | 198/847 |
| 5,480,604 A | | 1/1996 | Johnson et al. | 264/138 |
| 5,488,976 A | | 2/1996 | Lorenz et al. | 139/383 AA |
| 5,503,196 A | | 4/1996 | Josef et al. | |
| 5,514,456 A | | 5/1996 | Lefferts | 428/222 |
| 5,641,001 A | | 6/1997 | Wilson | 139/383 |
| 5,697,491 A | * | 12/1997 | Alex | 198/846 |
| 5,707,496 A | | 1/1998 | Johnson et al. | 162/348 |
| 5,720,323 A | | 2/1998 | Tremer | 139/446 |
| 5,732,749 A | * | 3/1998 | Fargeout | 139/383 AA |
| 5,746,257 A | | 5/1998 | Fry | 139/383 |
| 5,769,131 A | | 6/1998 | Whitlock et al. | 139/383 |
| 5,787,936 A | | 8/1998 | Snipes | 139/383 |
| 5,820,959 A | * | 10/1998 | Whittaker | 428/61 |
| 5,875,822 A | | 3/1999 | Fargeout | 139/383 |
| 5,906,269 A | * | 5/1999 | Zabron et al. | 198/847 |
| 5,915,422 A | | 6/1999 | Fagerholm | 139/383 |
| 5,938,007 A | * | 8/1999 | Fujihiro et al. | 198/847 |
| 5,941,369 A | * | 8/1999 | Katsura et al. | 198/847 |
| 5,965,208 A | * | 10/1999 | Fagerholm et al. | 427/428.21 |
| 6,001,443 A | | 12/1999 | Holden et al. | 428/61 |
| 6,065,505 A | | 5/2000 | Fickers | 139/383 |
| 6,123,116 A | | 9/2000 | Ward et al. | 139/383 |
| 6,140,260 A | * | 10/2000 | Johnson et al. | 442/270 |
| 6,176,271 B1 | * | 1/2001 | Sayers et al. | 139/383 AA |
| 6,194,331 B1 | * | 2/2001 | Elkins | 442/225 |
| 6,241,081 B1 | * | 6/2001 | Holden | 198/844.2 |
| 6,265,048 B1 | | 7/2001 | Rydin et al. | 428/121 |
| 6,305,027 B2 | | 10/2001 | Chou | 2/227 |
| 6,328,079 B1 | | 12/2001 | Zils | 162/383 |
| 6,378,566 B1 | * | 4/2002 | Kornett | 139/383 AA |
| 6,451,412 B1 | | 9/2002 | Holden | 428/193 |
| 6,544,389 B2 | | 4/2003 | Johnson | 162/348 |
| 6,695,134 B2 | * | 2/2004 | Rubino et al. | 198/851 |
| 6,712,100 B2 | * | 3/2004 | Yook et al. | 139/383 A |
| 6,712,940 B2 | * | 3/2004 | Crook | 162/306 |
| 6,773,553 B2 | | 8/2004 | Hyvonen et al. | 162/358.2 |
| 6,797,121 B2 | | 9/2004 | Hyvonen et al. | 162/358.2 |
| 6,880,583 B2 | | 4/2005 | Billings | 139/383 |
| 6,994,209 B2 | * | 2/2006 | Cediel et al. | 198/847 |
| 6,994,210 B2 | * | 2/2006 | Kerwel et al. | 198/847 |
| 7,306,703 B2 | * | 12/2007 | Hawes | 162/358.2 |
| 2004/0143937 A1 | * | 7/2004 | Allen | 16/373 |
| 2005/0145361 A1 | * | 7/2005 | Rautanen | 162/900 |
| 2007/0044931 A1 | * | 3/2007 | Crook et al. | 162/358.2 |

FOREIGN PATENT DOCUMENTS

| | | |
|---|---|---|
| EP | 0 099 836 | 2/1984 |
| EP | 0 108 733 A | 5/1984 |
| EP | 0 564 436 | 3/1993 |
| EP | 0 564 436 B1 | 1/1996 |
| EP | 1 241 378 A | 9/2002 |
| EP | 1719932 A1 | 11/2006 |
| FR | 1.575.375 | 7/1969 |
| FR | 2 145 365 | 2/1973 |
| GB | 2 289 648 A | 11/1995 |
| WO | WO 90/10165 | 9/1990 |
| WO | WO 93/17161 | 9/1993 |

* cited by examiner

SEAM-ON LAMINATED BELT

BACKGROUND OF THE INVENTION

1. Field of the Invention

The present invention relates to on-machine-seamable industrial belts and methods of making industrial belts. Specifically, the present invention relates to seamed laminated belts for use in industrial applications.

2. Description of the Prior Art

Industrial belts referred to herein may include those used as conveyors and conveyor belts used in the food processing industries, belts used for the product of medium density fiberboard (MDF), and belts used in the production of nonwovens, i.e. carding, lapping, and other industrial applications. Typically these belts are impermeable which, for example, in the food processing industry is useful in preventing the adherence of bacteria and promotes ease of cleaning of the belt.

Traditionally, belts used in these industries or for these application have either been formed endless, by for example endless weaving, or alternatively a seam such as a clipper seam is attached to the two cross-machine ("CD") edges of the belt in order to make the belt endless. Another approach which is sometimes used to form an endless belt is brazing or welding the cross-machine edges of the belt together. As will be readily appreciated, the brazing requires the belt to include metal portions that can be joined together. Yet a further approach for making a belt endless is the joining with a pin seam wherein the two CD-edges of the belt are made endless by interdigitation of loops formed from the machine direction ("MD") yarns on the edges of the belt and inserting a pin or pintle there through to hold the interdigitated loops together.

The clipper seam mentioned above is a very common device used to seam a belt into an endless form. This variety of seam comprises a plurality of generally U-shaped clipper hooks, which are installed in an alternating relationship on the CD-edges of typically a corrugator belt, so that, when the two CD-edges of the belt are brought together, they may be interdigitated to define a passage through which a lacing cable or pintle may be directed to secure one edge to the other. The individual clipper hooks are of stiff metal wire, and have two parallel members which are separated from one another by an amount substantially equal to, or slightly less than, the thickness of the belt, and which have mutually directed barbs, so that, when pushed onto the edge of the belt, they are not readily removed. The two parallel members, which are on opposite sides of a CD-edge of the belt after the clipper hook has been installed, and which lie snugly against the opposite surfaces thereof, may be of equal or different length, and may therefor extend the same or different amounts longitudinally from the CD-edge of the belt.

Mechanical fasteners of other types are sometimes used. There are tapered overlays or joints for fastening or seaming, such as those used by Siegling GmbH, Hannover, Germany and Habasit AG, Basel, Switzerland on their belts.

Other seams may be sewn on which involves a woven web or spiral lace sewn onto both CD-edges of the belt with the woven web or spiral lace includes connecting loops. Alternatively, the woven base structure of the belt may contain connecting loops. In either event the connecting loops are meshed together to form the seam through the application of a pintle through the interdigitated loops.

However, these heretofore known methods of seaming have certain drawbacks for certain applications. One aspect of certain belts is the desire to ensure a smooth and uniform surface for the product being conveyed. One method of providing such a surface is for lamination of a layer or layers of material onto one another or onto, for example, a woven or knit base structure. However, the seaming methods described above do not always allow for a smooth surface. Those skilled in the art will appreciate that the seaming of laminated structure presents its own problems in terms of uniformity, impermeability, wear, and fatigue resistance.

One particular problem that affects laminated belts is that the lamination material, such as polyurethane or silicone films, may delaminate from the base structure. This delamination may often be caused by the method or the means employed for joining the two edges of the fabric.

This problem has proven to be particularly troubling in the lamination or coating of belts useful in the conveyance of foodstuffs. These coatings are often provided with certain useful attributes including antibacterial features or a particular resistance to adherence of the material deposited thereon. As can be imagined, the delamination of antibacterial coatings from a conveyor for food stuffs provides a two fold problem of contamination of the foodstuff by the delamination as well as a breakdown in the antibacterial effect. Accordingly, preventing this delamination is of great utility to the food processing and packaging industry.

Another issue is that since seaming methods do not address openings in the belt made by the seaming technique itself, such seams provide an opportunity for foodstuffs or contaminants to become imbedded in the seam and thereby nullify much of the antibacterial and cleanliness properties of the belt, that is otherwise impervious.

Obviously, there are ways to provide seamable fabrics for use in industrial applications, with the foregoing being set forth merely as examples. However, as with anything, there is always a desire to improve on or provide an alternative to what has been done previously. Seamable fabrics are no exception. The present invention is directed to resolving the shortcomings of the known seaming methods.

SUMMARY OF THE INVENTION

Accordingly, the present invention is both a seamed industrial belt, and the method of making it.

One object of the present invention is to provide a laminated seamable belt that substantially resists delamination.

It is another objective of the present invention to provide a means of joining a laminated belt utilizing a set-in seam.

It is a further objective of the present invention to provide a laminated belt including an extruded seam spiral.

One aspect of the present invention is directed to an on-machine-seamable belt including: a base structure having a first and second edge; one or more layers of material laminated to the base structure; and a seam for seaming the first and second edges together to form an endless belt, wherein a laminated material layer is attached to the base structure over and covering the seam. A second layer can be laminated on the other side of the base extending below the seam. The belt further includes one or more flaps cut from the layers laminated to the base structure with the flaps providing access to the seam and protecting it from exposure. In this context, "base structure" can either be a component of the belt, or the entire belt prior to the laminated material layer or layers being applied.

A further aspect of the present invention is directed to an on-machine-seamable belt including a base structure having a first and second edges, a layer laminated to the base structure and over and preferably also below a seam formed of a set-in seam attached to the first edge of the base structure and set of seaming loops formed on the second edge of the base structure, wherein the layers laminated to the base structure protect the set-in seam and prevent the material carried thereon from passing through the seam Yet a further aspect of the present invention is directed to an on-machine-seamable belt including a base structure having first and second edges, a layer laminated to the top and bottom surfaces of the base structure, and an extruded spiral attached to each of the first and second edges, wherein the laminated layer have a shorter length than the base structure, and wherein the laminated layers abut edge to edge when the extruded spirals are interdigitated.

As to all of the embodiments, the method in general involves forming an on-machine-seamable belt which includes the steps of providing a base structure having first and second edges, providing a seam connecting the first and second edges, and laminating a layer onto the base structure and in most embodiments at least above and also preferably below the seam.

The present invention will now be described in more complete detail with reference being made to the figures identified as follows.

DETAILED DESCRIPTION OF THE PREFERRED EMBODIMENT

As described above, there are a variety of applications in which a fabric or belt may act as a conveyor. The specific examples previously described involved applications for transporting a variety of items including, for example, foodstuffs and in the production of MDF and nonwovens. The present invention is, however, not so limited and may be applied to any use requiring a seamed and laminated belt in industrial applications.

Figure 1:
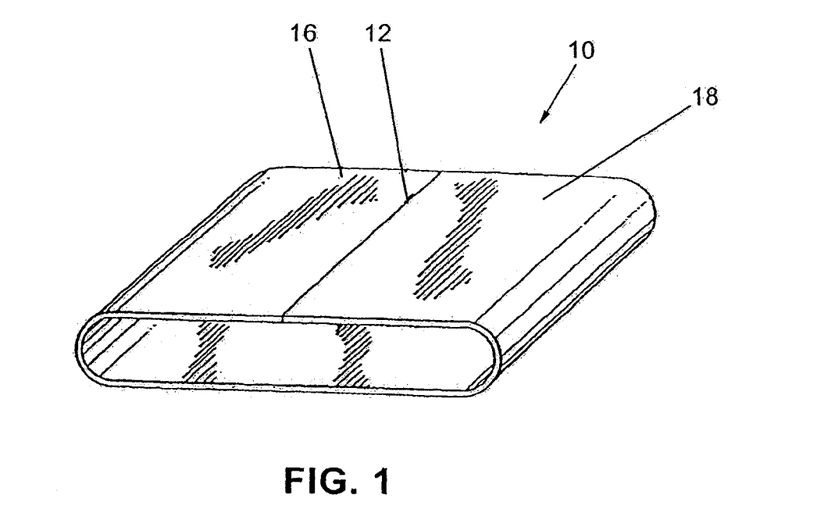
FIG. 1 is a cross-sectional view of a seamed belt according to one aspect of the present invention.
Figure 2:
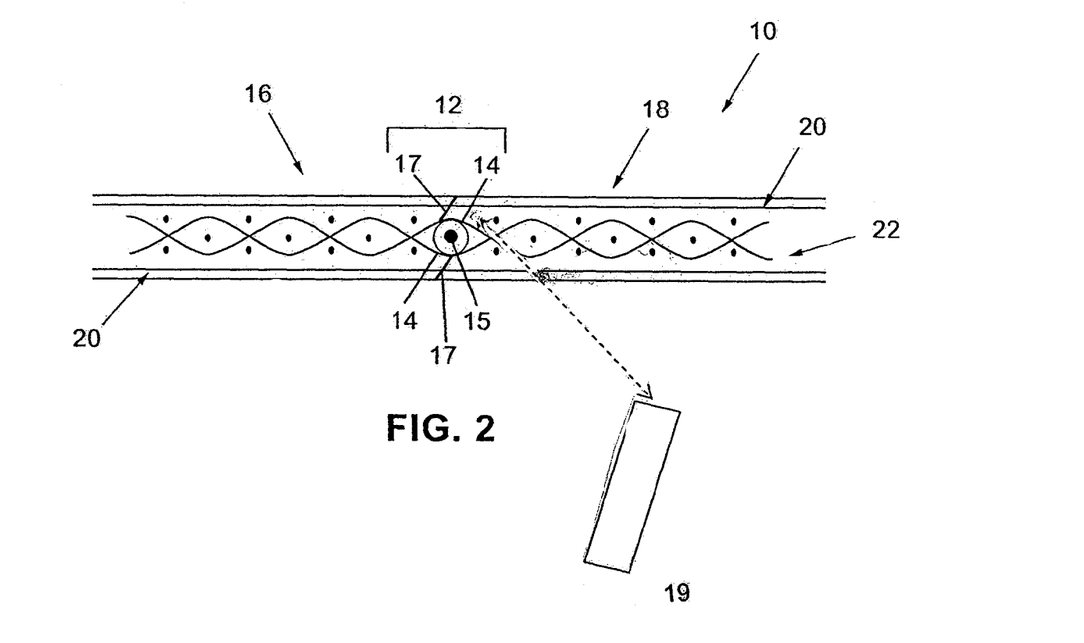
FIG. 2 is a cross-sectional view of a seamed belt as shown in FIG. 1 after seaming.

One aspect of the present invention can be seen with reference to FIGS. 1 and 2. In FIG. 1, a belt 10 having an integrated seam 12 is shown. The seam has been joined to form an endless belt. The integrated seam may be formed of a standard loop seam wherein the MD yarns of the base form the loops. Alternatively a spiral is attached to form a spiral seam, such as an in-line spiral seams as known to those of skill in the art, or any other seam construction suitable for the purpose may be used. In FIG. 2 there is shown a loop seam 14 seaming the two edge portions 16 and 18 of the belt 10 together in the cross machine direction ("CD") using a pintel 15. Overlying base structure 12 is a laminate 20 which is at least above the seam 12 and preferably also below it. The laminate 20 includes a cut 17 exposing at least a portion of the loop seam 14 and the pintle 15.

In production of the belt 10, according to one aspect of the present invention, the base structure 22 including the seaming loops of the loop seam 14 are formed and joined using for example a pintle 15 to form an endless belt 10 as shown in FIG. 1. A protective covering 19 is placed over the seam to prevent the adherence of a coating or laminate thereto. The endless belt 10 is then laminated with a film 20 to form an endless belt. Examples of coating or lamination material may include coPET and PET films, or a combination of coPET or PET films, polyurethane, or other suitable materials known to those of skill in the art. The endless belt is then cut (17) along the seam 12 above the seam (and below the seam if both sides were laminated) to create a flap(s) of laminate material and to allow for removal of the pintle 15. At this point the protective covering 19 which was installed to protect the seam is also removed.

Figure 3:
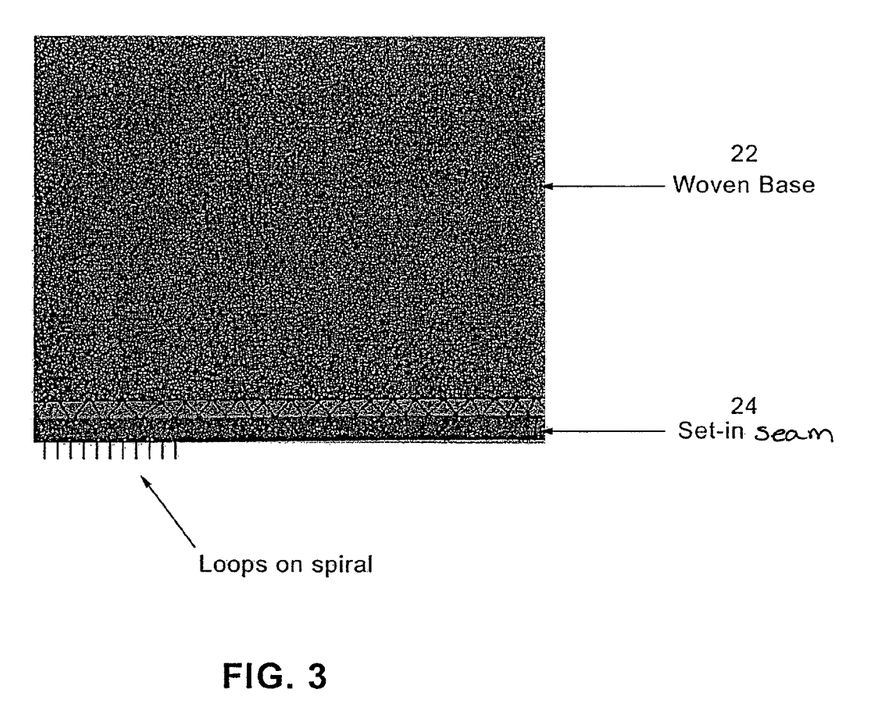
FIG. 3 is a top view of a seamed belt according to a further aspect of the present invention.
Figure 4:
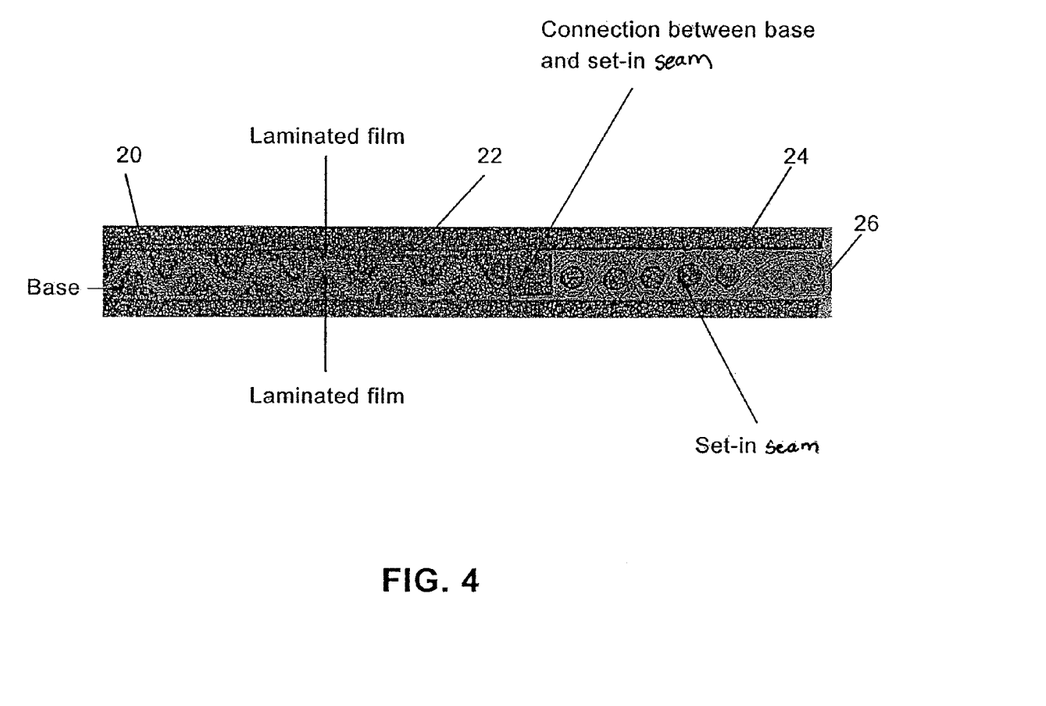
FIG. 4 is a cross-sectional view of a seamed belt shown in FIG. 3.

A further aspect of the present invention can be seen with reference with FIGS. 3 and 4. According to this aspect of the present invention, a base structure 22 may be formed by for example weaving. On one or both edges of the woven base structure 22 seaming loops may be formed by weaving MD yarns back into the base structure to form seaming loops along the cross machine direction edge of the base structure 22. Alternatively, a seaming spiral may be inserted into the base structure at one or both edges. As a further alternative on an edge of the base structure 22, a set-in seam 24 may be attached. The set-in seam 24 may be attached to the base structure 22 by for example welding, sewing or gluing of the set-in seam 24 to the base structure 22. The set-in seam 24 includes on the edge not attached to the base structure 22 a series of loops 26 that can be interdigitated with the loops formed on the edge of the base structure 22. These loops can then be joined by use of a pintle to form an endless fabric.

The base structure 22, seaming loops, seaming spiral and set-in seam 24 or whatever combination thereof can then be laminated thereabove and preferably therebelow. Again, prior to lamination the seaming loops, etc., must be protected to prevent adhesion of the coating or laminate film applied thereto. The coating or lamination will provide cohesion and uniformity between the belt and the seam area. Again, following coating or lamination the laminate may be cut to allow for on-machine-seaming of the belt. Alternatively, the belt may be laminated without being formed endless, and following interdigitation of the loops and insertion of a pin therethrough during installation, the edges of the laminate will abut against one another when formed endless so that a continuous surface is presented.

Figure 5:
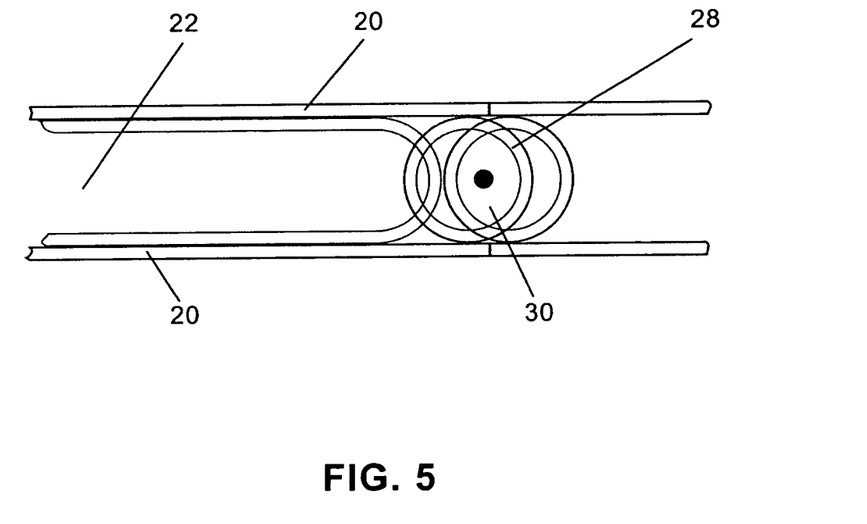
FIG. 5 is a cross-sectional view of a seamed belt according to a further aspect of the present invention.

A further aspect of the present invention is shown in FIG. 5. FIG. 5 depicts a base structure 22 having a laminated layer 20 formed over and under the base structure 22. On the edge of the base structure 22 and attached thereto is a seaming spiral 28. The seaming spiral 28 is attached to the base structure preferably after lamination; however, the seaming spiral 28 may also be attached to the base structure 22 before lamination. Each edge of the base structure 22 may include a seaming spiral 28, which when brought together and interdigitated can be joined by placement of a pintle through the orifice 30.

Figure 6:
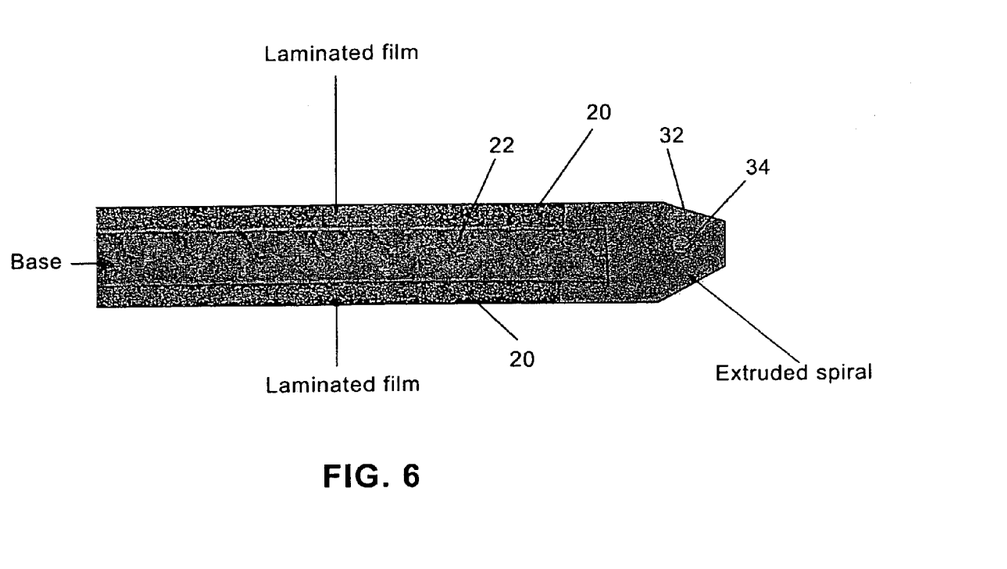
FIG. 6 is a cross-sectional view of a seamed belt according to a further aspect of the present invention.
Figure 7:
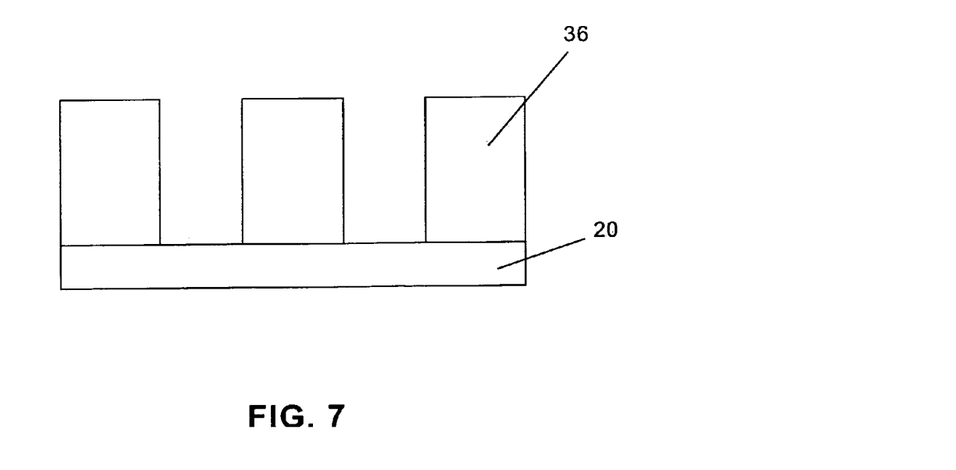
FIG. 7 is a top view of the seamed belt shown in FIG. 6.

Yet a further aspect of the instant invention is shown in FIG. 6. In FIG. 6, a base structure 22 having a laminated layer 20 formed over and under the base structure 22. Attached to the end of the base structure and attached thereto is a edge piece 32. The edge pieces are formed having a series of tabs 36 as shown in FIG. 7. Each tab includes a hole 34. In use, the edge pieces 32 are formed on both CD edges of a conveyor, interdigitated, and a pintle is set through the holes 34 of the tabs 36 forming and seamed endless conveyor. The interdigitated tabs 36 create a substantially uniform surface that prevents food stuffs and the like from migrating through the conveyor. The edge piece 32 is formed on the base structure preferably after lamination of layers 20, however, the edge piece may also be formed on the base structure prior to lamination. In the embodiment shown in FIG. 6, the lamination is stopped a few millimeters before the edge of the base structure 22 to accommodate the edge piece 32.

Figure 8:
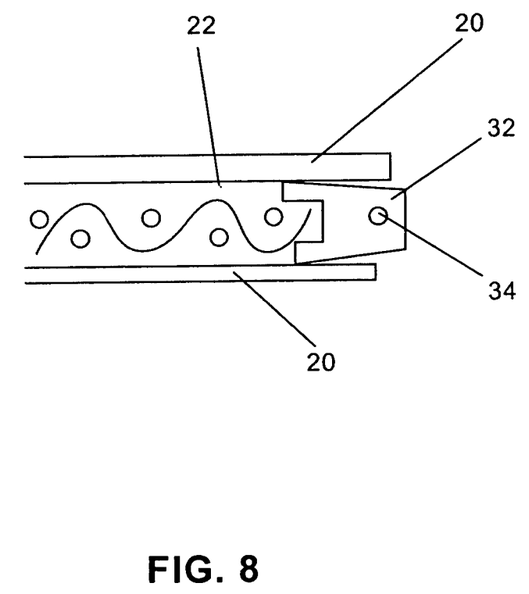
FIG. 8 is a cross-sectional view of a seamed belt according to a further aspect of the invention.

In yet another embodiment shown in FIG. 8. the edge piece 32 is shown with a height no greater than the base structure 22. The edge piece 32 is attached to the base structure 22 and the lamination layers 20 extend over the edge piece 32. In such a configuration, the laminated layers 20 further assist in presenting a continuous and smooth surface to any material deposited on the conveyor.

Accordingly, by use of one or more of the forgoing aspects of the present invention a belt may be formed which does not suffer from certain of the undesired attributes of those heretofore known to those of skill in the art. Simultaneously, the present invention provides a laminated structure that prevents particles from contaminating the belt particularly in the seam area, resists bacterial development, reduces the risk of delamination associated with for example clipper seams all while providing a readily seamable belt.

What is claimed is:

1. An on-machine-seamable industrial belt comprising:
   a base structure having a first and second edge in the cross machine direction ("CD");
   a protective first laminate film layer laminated directly on a first side of said base structure, wherein said layer does not partially or completely fill the base structure;
   a seaming means for seaming the first and second edges together to form an endless belt structure, wherein said first layer is attached to said base structure over said seaming means; and
   a flap cut along the seam from said first layer laminated to said base structure, said flap providing access to said seaming means and protecting said seaming means from exposure and presenting a substantially continuous and impermeable surface,
   wherein the belt is adapted for at least localized heat to be applied to the seam area to laminate the film to the base structure in the seam area after installation and connection of the belt via the seaming means.

2. The on-machine-seamable industrial belt of claim 1, further comprising a second layer laminated to a second side of said base structure with a flap cut therein.

3. The on seamable industrial belt of claim 1, wherein the seaming means comprises machine direction ("MD") yarns which when woven back into the edges of said base structure form seaming loops.

4. The on-machine-seamable industrial belt of claim 1, wherein the seaming means comprises one or more seaming spirals or edge pieces attached to the edge of said base structure.

5. An on-machine-seamable industrial belt comprising:
   a base structure having a first and second edge in a cross machine direction ("CD");
   a protective first laminate film layer laminated directly onto a first side of said base structure, wherein said layer does not partially or completely fill the base structure;
   a seam formed of a set-in seam attached to the first edge of said base structure and seaming loops formed on the second edge of said base structure, wherein the first layer laminated to said base structure protects the set-in seam and seaming loops and presents a substantially continuous and impermeable surface,
   wherein the belt is adapted for at least localized heat to be applied to the seam area to laminate the film to the base structure in the seam area after installation and connection of the belt via the seaming means.

6. The on-machine-seamable industrial belt of claim 5, Wherein the layer laminated to said base fabric is cut to form a flap and allow access to said set-in seam for seaming.

7. The on-machine-seamable industrial belt of claim 5, further comprising a second layer laminated to a second side of said base structure with a flap cut therein.

8. The on-machine-seamable industrial belt of claim 7, wherein the layers laminated to said base structure are formed on the base structure and abut edge to edge when the belt is formed endless.

9. The on-machine-seamable industrial belt of claim 5, wherein the set-in seam and the seaming loops are interdigitated and joined with a pintle.

10. The on-machine-seamable industrial belt of claim 5, wherein the seaming loops are a seaming spiral attached to said base structure.

11. An on-machine-seamable industrial belt comprising:
    a base structure having a first and second edge in the cross machine direction ("CD");
    a protective first laminate film layer laminated directly onto a first side Of said base structure, wherein said layer does not partially or completely fill the base structure;
    a seaming spiral attached to each of said first and second edges, and wherein said first laminated layer has a shorter length than the base structure,
    wherein the belt is adapted for at least localized heat to be applied to the seam area to laminate the film to the base structure in the seam area after installation and connection of the belt via the seaming means.

12. The on-machine-seamable industrial belt of claim 11, wherein the seaming spirals attached to said first and second edges are interdigitated and joined with a pintle to form an endless fabric.

13. The on-machine-seamable industrial belt of claim 11, further comprising a second layer laminated to a second side of the base structure.

14. A method of forming an on-machine-seamable industrial fabric comprising the steps of:
    providing a base structure having first and second edges in the cross machine direction ("CD");
    providing a seaming means connecting said first and second edges; and
    laminating a protective first laminate film layer directly onto a first side of said base structure, wherein said layer does not partially or completely fill the base structure,
    wherein the belt is adapted for at least localized heat to be applied to the seam area to laminate the film to the base structure in the seam area after installation and connection of the belt via the seaming means.

15. The method of claim 14, wherein the seaming means comprises seaming loops formed from the yarns forming said base structure, set in seam or seaming spirals.

16. The method of claim 15, further comprising Steps of:
    interdigitating said seaming means;
    inserting a pintle into said seaming means to make the on-machine-scannable fabric endless; and
    providing a protective covering over said seaming means to protect said seaming means from the laminated first layer, wherein the lamination step is performed following insertion of the pintle and provision of said protective covering.

17. The method of claim 16, further comprising a step of cutting a flap into the first layer to allow access to said seaming means.

18. Tire method of claim 17, further comprising a step of applying a second layer laminated to a second side of said base structure with a flap cut therein.

19. The method of claim 16, wherein edges of the laminated first layer covering the base structure and seam abut against each other When the seaming means are joined to form an endless belt and a substantially continuous and impermeable surface thereon.

20. The method of claim 14, further comprising a step of attaching said seaming means at each edge of the base structure, wherein said seaming means comprise an extruded spiral or edge piece.

21. The method of claim 20, wherein during said lamination step the first laminating layer has a shorter length than the base structure, and wherein edges of said first layer abut edge to edge when the extruded spirals or tabs of the edge piece are interdigitated.

22. The method of claim 21, further comprising a step of laminating a second layer onto a second side of said base structure having a shorter length than the base structure.

23. An on machine-seamable industrial belt comprising:
 a base structure having a east and second edge in the cross machine direction ("CD");
 a protective first laminate film layer laminated directly onto a first side of said base structure, wherein said layer does not partially or completely fill the base structure; and
 an edge piece attached to each of said first and second edges, the edge piece including a plurality of tabs, wherein said tabs may be interdigitated and secured to form an endless belt,
 wherein the laminated layer extends over the edge piece and wherein the belt is configured at least localized heat to be applied to laminate the film to the base structure over the edge piece after installation and connection of the belt, via the seaming means.

24. The on-machine-seamable industrial belt of claim 23, further comprising a second laminated layer laminated to a second side of said base structure.

* * * * *